United States Patent
Rios et al.

(10) Patent No.: US 9,732,445 B2
(45) Date of Patent: Aug. 15, 2017

(54) LOW TEMPERATURE STABILIZATION PROCESS FOR PRODUCTION OF CARBON FIBER HAVING STRUCTURAL ORDER

(71) Applicant: UT-Battelle, LLC, Oak Ridge, TN (US)

(72) Inventors: Orlando Rios, Knoxville, TN (US); Michael Alan McGuire, Knoxville, TN (US); Karren Leslie More, Knoxville, TN (US); Wyatt Evan Tenhaeff, Rochester, NY (US); Paul A. Menchhofer, Clinton, TN (US); Felix Leonard Paulauskas, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 368 days.

(21) Appl. No.: 14/640,788

(22) Filed: Mar. 6, 2015

(65) Prior Publication Data
US 2016/0258082 A1 Sep. 8, 2016

(51) Int. Cl.
*D01F 9/20* (2006.01)
*D01F 9/14* (2006.01)
(Continued)

(52) U.S. Cl.
CPC ............... *D01F 9/14* (2013.01); *D01F 1/10* (2013.01); *B29C 44/464* (2013.01); *D01F 9/12* (2013.01);
(Continued)

(58) Field of Classification Search
CPC ..... D01F 1/10; D01F 9/12; D01F 9/14; D01F 9/16; D01F 9/17; D01F 9/145; D01F 9/15;
(Continued)

(56) References Cited

U.S. PATENT DOCUMENTS 3,461,082 A 8/1969 Otani et al.
4,020,145 A 4/1977 Soehngen et al.
(Continued)

OTHER PUBLICATIONS

Kadla et al. "Lignin-based Carbon Fibers for Composite Fiber Applications", Carbon, vol. 40 (2002), pp. 2913-2920.*
(Continued)

*Primary Examiner* — Matthew Daniels
*Assistant Examiner* — Lawrence D Hohenbrink, Jr.
(74) *Attorney, Agent, or Firm* — Scully Scott Murphy & Presser

(57) ABSTRACT

A method for producing a carbon fiber, the method comprising: (i) subjecting a continuous carbon fiber precursor having a polymeric matrix in which strength-enhancing particles are incorporated to a stabilization process during which the carbon fiber precursor is heated to within a temperature range ranging from the glass transition temperature to no less than 20° C. below the glass transition temperature of the polymeric matrix, wherein the maximum temperature employed in the stabilization process is below 400° C., for a processing time within said temperature range of at least 1 hour in the presence of oxygen and in the presence of a magnetic field of at least 1 Tesla, while said carbon fiber precursor is held under an applied axial tension; and (ii) subjecting the stabilized carbon fiber precursor, following step (i), to a carbonization process. The stabilized carbon fiber precursor, resulting carbon fiber, and articles made thereof are also described.

22 Claims, 3 Drawing Sheets

(51) Int. Cl.
*D01F 1/10* (2006.01)
*D01F 9/145* (2006.01)
*D01F 9/15* (2006.01)
*D01F 9/16* (2006.01)
*D01F 9/22* (2006.01)
*D01F 9/21* (2006.01)
*B29C 44/46* (2006.01)
*D01F 9/12* (2006.01)
*D01F 9/155* (2006.01)
*D01F 9/17* (2006.01)

(52) U.S. Cl.
CPC .............. *D01F 9/145* (2013.01); *D01F 9/15* (2013.01); *D01F 9/155* (2013.01); *D01F 9/16* (2013.01); *D01F 9/17* (2013.01); *D01F 9/20* (2013.01); *D01F 9/21* (2013.01); *D01F 9/22* (2013.01); *D01F 9/225* (2013.01)

(58) Field of Classification Search
CPC ... D01F 9/155; D01F 9/20; D01F 9/21; D01F 9/22; D01F 9/225; B29C 44/464
USPC ... 264/430, 29.1, 29.2, 29.6, 29.7, 433, 638, 264/172.17
See application file for complete search history.

(56) References Cited

U.S. PATENT DOCUMENTS

| | | | |
|---|---|---|---|
| 4,576,810 A * | 3/1986 | Redick | D01F 9/322 242/118.1 |
| 5,238,672 A * | 8/1993 | Sumner | D01F 9/155 208/39 |
| 5,416,056 A | 5/1995 | Baker | |
| 6,372,192 B1 | 4/2002 | Paulauskas et al. | |
| 6,375,875 B1 | 4/2002 | Paulauskas et al. | |
| 7,534,854 B1 | 5/2009 | Paulauskas et al. | |
| 7,649,078 B1 | 1/2010 | Paulauskas et al. | |
| 7,678,358 B2 | 3/2010 | Eckert et al. | |
| 7,745,765 B2 | 6/2010 | Kisner et al. | |
| 7,786,253 B2 | 8/2010 | Paulauskas et al. | |
| 7,824,495 B1 | 11/2010 | White et al. | |
| 2006/0066201 A1 | 3/2006 | Ra et al. | |
| 2007/0104947 A1 | 5/2007 | Shambaugh | |
| 2007/0142225 A1 | 6/2007 | Baker | |
| 2008/0128659 A1 | 6/2008 | Parker et al. | |
| 2008/0150556 A1 | 6/2008 | Han et al. | |
| 2008/0317661 A1 | 12/2008 | Eckert et al. | |
| 2010/0120969 A1 | 5/2010 | Tsotsis | |
| 2011/0285049 A1 * | 11/2011 | Baker | B29C 47/38 264/105 |
| 2013/0053471 A1 * | 2/2013 | Studart | B29C 67/24 523/115 |
| 2014/0038034 A1 * | 2/2014 | Rios | H01M 4/133 429/188 |
| 2014/0265038 A1 | 9/2014 | Naskar et al. | |
| 2015/0233023 A1 * | 8/2015 | Chang | D01F 9/17 264/29.2 |

OTHER PUBLICATIONS

Sung et al. "Strengthening of Carbon Fibers by a Magnetic Field Imposed in the Stabilization and Carbonization Process", Materials Science and Engineering, vol. A 488 (2008), pp. 247-251.*
Braun et al., "Lignin-based Carbon Fibers: Oxidative Thermostabilization of Kraft Lignin", Carbon, vol. 43 (2005), pp. 385-394.*
Chino Y. et al., "Processing and Mechanical Properties of a Porous Low Carbon Steel With a Controlled Porous Structure by Imposition of a Static Magnetic Field", Materials Science and Engineering A 417:281-286 (2006).
Druzhinina T. et al., "Strategies for Post-Synthesis Alignment and Immobilization of Carbon Nanotubes", Advanced Materials 23:953-970 (2011).
Little R.B. et al., "Magnetization for Low Temperature, Selective Diamond and Carbon Nanotube Formation: A Milestone in Carbon Physicochemical Condensation", Journal of Applied Physics 95(5):2702-2712 (Mar. 1, 2004).
Sung M.G. et al., "Application of a High Magnetic Field in the Carbonization Process to Increase the Strength of Carbon Fibers", Carbon 40:2013-2020 (2002).
Takahashi T. et al., "Polycarbonate Crystallization by Vapor-Grown Carbon Fiber With and Without Magnetic Field", Macromolecular Rapid Communications 24(13):763-767 (2003).

* cited by examiner

LOW TEMPERATURE STABILIZATION PROCESS FOR PRODUCTION OF CARBON FIBER HAVING STRUCTURAL ORDER

This invention was made with government support under Prime Contract No. DE-AC05-00OR22725 awarded by the U.S. Department of Energy. The government has certain rights in the invention.

FIELD OF THE INVENTION

The present invention relates generally to methods for producing carbon fiber, and more particularly, to such methods wherein a precursor fiber is subjected to a stabilization process followed by a carbonization process.

BACKGROUND OF THE INVENTION

Carbon fiber and composites thereof are increasingly being employed as structural materials in various industries, in large part due to their high strength and low weight. The applications include, for example, the automotive, sports, aviation, tools, and military equipment. As the cost of carbon fiber continues to fall, the market for carbon fiber continues to expand.

Although carbon fiber is generally known for its high strength characteristics, the mechanical properties of carbon fiber are highly dependent on the production process. Depending on the process conditions, particularly in the stabilization and carbonization steps, the carbon fiber may have a non-optimal strength for certain applications, or be generally of acceptable strength but suffer from brittleness or inadequate elastic modulus. There is a persistent and continued need in the art for carbon fiber having improved mechanical properties.

SUMMARY OF THE INVENTION

The instant disclosure is directed to methods for producing carbon fiber having an improved level of tensile strength and toughness. The method achieves this by employing a low temperature stabilization process during which the polymer precursor fiber is permitted to undergo microscopic and molecular level rearrangements resulting in ordering (i.e., alignment) of polymeric domains. In particular embodiments, the carbon fiber precursor contains strength-enhancing particles embedded within a polymeric matrix, in which case the particles may also become ordered (i.e., aligned) during the stabilization process.

In particular embodiments, the method includes: (i) subjecting a continuous carbon fiber precursor having a polymeric matrix in which strength-enhancing particles are incorporated to a stabilization process during which the carbon fiber precursor is heated to within a temperature range ranging from the glass transition temperature to no less than 20° C. below the glass transition temperature of the polymeric matrix, wherein the maximum temperature employed during the stabilization process is below 400° C., for a processing time within the aforesaid temperature range of at least 1 hour in the presence of oxygen and in the presence of a magnetic field of at least 1 Tesla, and while the carbon fiber precursor is held under an applied axial tension; and (ii) subjecting the stabilized carbon fiber precursor, following step (i), to a carbonization process. The instant disclosure is also directed to the stabilized precursor fiber resulting from the above-described stabilization process, and also the carbonized fiber produced by carbonization of the stabilized precursor fiber.

BRIEF DESCRIPTION OF THE FIGURES

FIG. 1A reveals an amorphous structure, while FIG. 1B reveals a crystalline structure. FIGS. 1C and 1D are corresponding structural models obtained from molecular dynamics (MD) computations, respectively.

FIG. 2A shows a ~40 nm diameter carbon nanotube (inner circle) with an associated "swirled" graphitic matrix (outer circle) where the (002) planes are somewhat more aligned (and have a slightly larger crystallite size) than observed away from the carbon nanotube within the more random nanocrystalline matrix. FIG. 2B is a magnified view of the TEM image in FIG. 2A.

DETAILED DESCRIPTION OF THE INVENTION

Figures 1A, 1B, 1C, 1D:
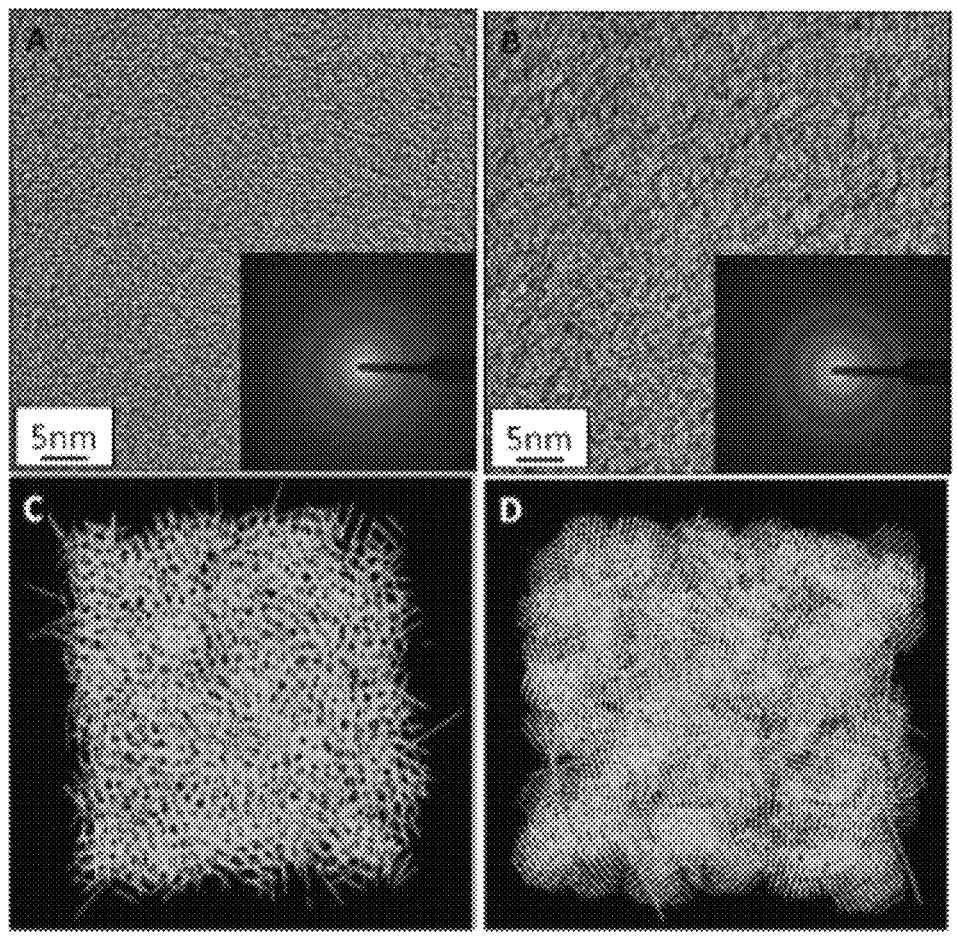
FIGS. 1A-1D. Transmission electron microscope (TEM) cross-section micrographs of carbon fiber produced from a lignin-carbon fiber precursor subjected to either a 1000° C. carbonization (FIG. 1A) or a 2000° C. graphitization heat treatment (FIG. 1B).

The carbon fiber precursor considered herein is generally continuous (i.e., as provided by a melt spinning process, typically on a spool) and can have any of the polymeric compositions well known in the art for producing carbon fiber. The polymer generally possesses a thermoplastic property in order that it can be melted, extruded, and solidified upon cooling. The term "polymer", as used herein, is meant to encompass homopolymers and copolymers, wherein the term "copolymer" herein refers to polymers having two or more different types of monomer units. The copolymer can be, for example, a strict copolymer having only two different types of monomer units, or a terpolymer, tetrapolymer, or higher copolymer. Moreover, the copolymer can have any suitable arrangement, such as block, alternating, periodic, random, linear, branched, or graft copolymer arrangement. The polymer can have any suitable weight-average molecular weight ($M_w$), such as precisely, about, at least, above, up to, or less than, for example, 10,000,000 g/mol, 5,000,000 g/mol, 1,000,000 g/mol, 500,000 g/mol, 400,000 g/mol, 300,000 g/mol, 200,000 g/mol, 100,000 g/mol, 50,000 g/mol, 10,000 g/mol, 5,000 g/mol, 2,500 g/mol, 2,000 g/mol, 1,500 g/mol, 1,000 g/mol, 500 g/mol, 250 g/mol, 200 g/mol, 150 g/mol, or 100 g/mol, or a $M_w$ within a range bounded by any two of the foregoing exemplary values. The polymer may also independently have any suitable number-average molecular weight $M_n$, wherein the number of units (n) in the polymer is typically at least or above 100, 150, 200, 300, 500, 1000, 5000, 10,000, 20,000, or 50,000. As used herein, the term "about" generally indicates within ±0.5, 1, 2, 5, or 10% of the indicated value. For example, in its broadest sense, the phrase "about 100 g/mol" can mean 100 g/mol±10%, which indicates 100±10 g/mol or 90–110 g/mol.

The polymer can be any of the thermoplastic and carbonizable polymers known in the art, such as, for example, a polyamide, polyester, polyacrylonitrile (PAN), polyolefin, lignin, polycarbonate, polystyrene, polybutadiene, polyether, polybenzimidazole, viscose, rayon, pitch, or combination thereof. In one instance, a combination of polymers refers to a copolymer of any of the recited polymers. In another instance, a combination of polymers refers to a physical blend of any of the recited polymers or copolymers thereof. Some examples of polyamide polymers include polyamide 6 (i.e., PA6 or Nylon 6), polyamide 6,6(Nylon 6-6), polyphthalamide (PPA), aramids (e.g., Kevlar®), and combinations thereof. Some examples of polyester polymers include polyethylene terephthalate (PET), polyethylene naphthalate (PEN), polyethylene furanoate (PEF), polycyclohexylenedimethylene terephthalate (PCT or PCDT), polylactic acid (PLA), polyglycolic acid (PGA), polycaprolactone (PCL), polyhydroxyalkanoate (PHA), polybutylene succinate (PBS), poly(ethylene succinate), poly(3-hydroxybutyrate-co-3-hydroxyvalerate (PHBV), polybutylene terephthalate, and combinations thereof. The term "polyolefin", as used herein, refers to polyvinyl polymers having pendant groups selected from hydrogen atom, alkyl groups, and/or halogen atoms. Some examples of polyolefins include polyethylene, polypropylene, polybutylene, polytetrafluoroethylene (PTFE), polyvinylidene fluoride (PVDF), polyvinyl fluoride (PVF), polyvinyl chloride (PVC), poly(methyl methacrylate), polybutadiene, polyvinylacetate, and combinations thereof. Some examples of polyethers include polyether ether ketone (PEEK), polyoxymethylene (POM), poly(p-phenylene oxide) (i.e., poly(p-phenylene ether) or PPE), polyethersulfone, polyphenylsulfone, polyetherimide (PEI), and combinations thereof.

In the case of the polymer being polyacrylonitrile, the PAN polymer may, in some embodiments, be a homopolymer of PAN (i.e., with only acrylonitrile pendant group). However, PAN is often in the form of a copolymer, such as a PAN-acrylate copolymer. The acrylate component may be selected from, for example, methyl acrylate, ethyl acrylate, propyl acrylate, butyl acrylate, methylmethacrylate, (2-hydroxyethylacrylate), vinyl acetate, acrylic acid, methacrylic acid, and itaconic acid. Other copolymers of PAN include, for example, styrene-acrylonitrile (SAN), acrylonitrile-butadiene-styrene (ABS), polybutadiene-acrylic acid-acrylonitrile terpolymer (PBAN), and acrylonitrile styrene acrylate (ASA).

In the case of the polymer being lignin, the lignin polymer considered herein is generally a crosslinked and/or copolymerized lignin thermoplastic that is melt-processible or amenable to melt-processing. By being "crosslinked" is generally meant that the lignin contains methylene (i.e., —CH$_2$—) and/or ethylene (i.e., —CH$_2$CH$_2$—) linkages (i.e., linking groups) between phenyl ring carbon atoms in the lignin structure. By being "melt-processible" is meant that the crosslinked lignin can be melted or converted to a molten, highly viscous, or rubbery state starting at a particular glass transition temperature. The melted or highly viscous lignin can then be more easily processed, such as by mixing, molding, applying on a surface, or dissolving in a solvent. In different embodiments, the lignin may be crosslinked to an extent that it has a number-average or weight-average molecular weight of precisely, about, at least, or greater than, for example, 10,000 g/mol, 25,000 g/mol, 50,000 g/mol, 75,000 g/mol, 100,000 g/mol, 125,000 g/mol, 150,000 g/mol, 175,000 g/mol, or 200,000 g/mol, or a molecular weight within a range bounded by any two of the foregoing exemplary values. The glass transition temperature ($T_g$) of the crosslinked lignin is generally above room temperature, wherein room temperature generally corresponds to 15, 20, 25, or 30° C. In different embodiments, the lignin (either isolated lignin from biomass or its crosslinked derivative) has a glass transition temperature of precisely, about, at least, or greater than 40° C., 50° C., 60° C., 70° C., 80° C., 90° C., 100° C., 105° C., 110° C., 115° C., 120° C., 125° C., 130° C., 140° C., 150° C., 160° C., 170° C., 180° C., 190° C., 200° C., 210° C., 220° C., 230° C., 240° C., or 250° C., or a $T_g$ within a range bounded by any two of the foregoing values.

The lignin component can be derived from any of a wide variety of lignin compositions found in nature or as known in the art. There is generally no uniform lignin composition found in nature. Lignin is a random polymer that shows significant compositional variation between plant species. Many other conditions, such as environmental conditions, age, and method of processing, influence the lignin composition. Lignins differ mainly in the ratio of three primary monomeric constituent alcohol units, i.e., p-coumaryl alcohol, guaiacyl alcohol or coniferyl alcohol, sinapyl alcohol or syringyl alcohol, and their derivatives such as 5-hydroxy coniferyl alcohol, dihydroconiferyl alcohol, ferulic acid, caffeic acid, caffeyl alcohol, coniferaldehyde, etc. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor lignin can have any of a wide variety of relative weight percents (wt %) of H, G, and S components. Different wood and plant sources (e.g., hardwood, softwood, switchgrass, and bagasse) often widely differ in their lignin compositions.

Besides the natural variation of lignins, there can be further compositional variation based on the manner in which the lignin has been processed. For example, the precursor lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfate (depending on pH), along with a counterion, is reacted with lignin to form a lignin bearing sulfonate (SO$_3$H) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation.

Generally, the carbon fiber precursor considered herein includes particles that confer additional strength to the carbon fiber end product. The particles can be composed of, for example, carbon, metal oxide, or metal. In some embodiments, the particles are filaments, wherein the term "filament", as used herein, refers to a particle, typically of no more than 10 mm in length, having a length dimension at least ten times its width dimension, which corresponds to an aspect ratio (i.e., length over width) of at least or above 10:1 (i.e., an aspect ratio of at least 10). In different embodiments, the filament has an aspect ratio of at least or above 10, 20, 50, 100, 250, 500, 1000, or 5000. In different embodiments, the filament can have a length of at least, above, up to, or less than, for example, 10 nm, 50 nm, 100 nm, 200 nm, 500 nm, 1000 nm (1 µm), 2 µm, 5 µm, 10 µm, 20 µm, 50 µm, 100 µm, 200 µm, 500 µm, 1000 µm (1 mm), 2 mm, 5 mm, or 10 mm, or a length within a range bounded by any two of the foregoing values. The filament can have a diameter of at least, above, up to, or less than, for example, 10 nm, 20 nm, 50 nm, 75 nm, 100 nm, 200 nm, 500 nm, 1 µm, 2 µm, 5 µm, 10 µm, 20 µm, 50 µm, 100 µm, or 200 µm, or a diameter within a range bounded by any two of the foregoing values, provided that the filament possesses an aspect ratio of at least 10. In some embodiments, the term "filament" refers only to particles having one dimension at least ten times greater than the other two dimensions. In other embodiments, the term "filament" also includes particles having two of its dimensions at least ten times greater than the remaining dimension, which corresponds to a platelet morphology. In the case of non-filament particles, these may have any suitable shape, such as, for example, approximately spherical, oblong, square, rectangular, platelet, or prismatic, and may have any average dimension provided above, such as 10 nm, 50 nm, 100 nm, 200 nm, 500 nm, 1000 nm (1 µm), 2 µm, 5 µm, 10 µm, 20 µm, 50 µm, 100 µm, 200 µm, 500 µm, 1000 µm (1 mm), 2 mm, 5 mm, or 10 mm, or a size within a range therein.

In the case of carbon particles, these can be, for example, carbon fibers, carbon nanotubes, platelet nanofibers, graphene, graphene oxide, graphene nanoribbons, graphite, carbon black, activated carbon, carbon foam, carbon onion, carbon nanoflakes, spherical fullerenes, amorphous carbon, or a mixture thereof. In the case of carbon fibers, these can be any of the high-strength carbon fiber compositions known in the art. Some examples of carbon fiber compositions include those produced by the pyrolysis of polyacrylonitrile (PAN), viscose, rayon, lignin, pitch, or polyolefin. The carbon fibers may also be vapor grown carbon fibers. The carbon fibers can be micron-sized carbon fibers, generally having inner or outer diameters of 1-200 microns or sub-range therein, or carbon nanofibers, generally having inner or outer diameters of 10-200 nm or sub-range therein. In the case of carbon nanotubes, these may be any of the single-walled or multi-walled carbon nanotubes known in the art, any of which may or may not be heteroatom-doped, such as with nitrogen, boron, oxygen, sulfur, or phosphorus. In other embodiments, the carbon fibers may be diamond nanothreads, as described, for example, in T. C. Fitzgibbons, et al., "Benzene-derived carbon nanothreads", *Nature Materials*, 14, 43-47 (2015), the contents of which are herein incorporated by reference. In the case of platelet carbon nanofibers, these can have an approximately rectangular platelet morphology with 1-100 micron length, as described, for example, in R. Zheng, et al., "Preparation, characterization and growth mechanism of platelet carbon nanofibers", *Carbon*, vol. 44, no. 4, pp. 742-746 (April 2006), the contents of which are herein incorporated by reference. In the case of graphene nanoribbons, these refer to free standing layers of graphene or graphene oxide with ultra-thin widths of generally less than 10, 5, 2, or 1 nm, as described, for example, in P. Han, et al., *ACS Nano*, 8(9), pp. 9181-9187, 2014 and Z. J. Qi, et al., *Nano Lett.*, 14(8), pp. 4238-4244 (2014), the contents of which are herein incorporated by reference. Carbon foam is generally understood to be a cluster of carbon atoms linked in graphite-like sheets, as described, for example, in A. Zani, et al., *Carbon*, vol. 56, pp. 358-365, May 2013. Carbon onion is generally understood to be composed of carbon particles having a concentric layered structure of spherical closed carbon (graphene) shells, as described, for example, in J. K. McDonough, et al., *Interface*, pp. 61-66, Fall 2013. Carbon nanoflakes are generally understood to be carbon nanoparticles having a two-dimensional nanostructure (essentially single graphenic sheets), as described, for example, in R. Pristavita, et al., *Plasma Chemistry and Plasma Processing*, 31(2), pp. 393-403, 2011. In the case of carbon filaments, such as carbon fiber, they preferably possess a high tensile strength, such as at least 500, 1000, 2000, 3000, 5000, or 10,000 MPa. In some embodiments, the carbon filament, particularly the carbon fiber, possesses a degree of stiffness of the order of steel or higher (e.g., 100-1000 GPa) and/or an elastic modulus of at least 50 Mpsi or 100 Mpsi.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %).

In the case of metal oxide particles, these can be, for example, those having or including a main group metal oxide composition, wherein the main group metal is generally selected from Groups 13 and 14 of the Periodic Table. In some embodiments, the metal oxide particles are metal oxide filaments, also known as metal oxide nanowires, nanotubes, nanofibers, or nanorods. Some examples of Group 13 oxide compositions include aluminum oxide, gallium oxide, indium oxide, and combinations thereof. Some examples of Group 14 oxide compositions include silicon oxide (e.g., glass), germanium oxide, tin oxide, and combinations thereof. The main group metal oxide may also include a combination of Group 13 and Group 14 metals, as in indium tin oxide. In other embodiments, the metal oxide particles have or include a transition metal oxide composition, wherein the transition metal is generally selected from Groups 3-12 of the Periodic Table. Some examples of transition metal oxides include scandium oxide, yttrium oxide, titanium oxide, zirconium oxide, hafnium oxide, vanadium oxide, niobium oxide, tantalum oxide, chromium oxide, molybdenum oxide, tungsten oxide, manganese oxide, iron oxide, ruthenium oxide, cobalt oxide, rhodium oxide, iridium oxide, nickel oxide, palladium oxide, copper oxide, zinc oxide, and combinations thereof. The metal oxide particle may also include a combination of main group and transition metals. The metal oxide particle may also include one or more alkali or alkaline earth metals in addition to a main group or transition metal, as in the case of some perovskite nanowires, such as $CaTiO_3$, $BaTiO_3$, $SrTiO_3$, and $LiNbO_3$ nanowires, and as further described in X. Zhu, et al., *J. Nanosci. Nanotechnol.*, 10(7), pp. 4109-4123, July 2010, and R. Grange, et al., *Appl. Phys. Lett.*, 95, 143105 (2009), the contents of which are herein incorporated by reference. The metal oxide particle may also have a spinel composition, as in $Zn_2TiO_4$ spinel nanowires, as described in Y. Yang et al., *Advanced Materials*, vol. 19, no. 14, pp. 1839-1844, July 2007, the contents of which are herein incorporated by reference. In some embodiments, the metal oxide particles are constructed solely of metal oxide, whereas in other embodiments, the metal oxide particles are constructed of a coating of a metal oxide on a non-metal oxide filament, e.g., silica-coated or germanium oxide-coated carbon nanotubes, as described in M. Pumera, et al., *Chem Asian J.*, 4(5), pp. 662-667, May 2009, and M. Pumera, et al., *Nanotechnology*, 20(42), 425606, 2009, respectively, the contents of which are herein incorporated by reference. The metal oxide layer may alternatively be disposed on the surface of a metallic particle. In the case of metal oxide filaments, these may have any of the lengths and diameters described above.

In the case of metal particles, these can be, for example, those having or including a main group metal composition, such as a silicon, germanium, or aluminum composition, all of which are well known in the art. The metal particles can also have a composition having or including one or more transition metals, such as nickel, cobalt, copper, gold, palladium, or platinum nanowires, as well known in the art. In some embodiments, the metal particles are metal filaments, also known as metal nanowires, nanotubes, nanofibers, or nanorods. In some embodiments, the metal filaments are doped with one or more non-metal dopant species, such as nitrogen, phosphorus, arsenic, or silicon to result in a metal nitride, metal phosphide, metal arsenide, or metal silicide composition. Many of these doped metal compositions are known to have semiconductive properties. For example, the metal particles may have a gallium nitride composition, as described, for example, in J. Goldberger, et al., *Nature*, vol. 422, pp. 599-602, April 2003, the contents of which are herein incorporated by reference. As well known in the art, the semiconducting nanowires may alternatively have an indium phosphide, gallium arsenide, gallium phosphide, silicon nitride, or boron nitride composition. In the case of metal filaments, these may have any of the lengths and diameters described above.

The amount (i.e., weight percent, or "wt %") of particles with respect to the weight of polymer can be any suitable amount, typically at least 1 wt %, 5 wt %, or 10 wt % and up to 30 wt %, 35 wt %, 40 wt %, 45 wt %, or 50 wt %. In different embodiments, the particles can be in an amount of precisely, about, at least, above, up to, or less than, for example, 1 wt %, 2 wt %, 5 wt %, 10 wt %, 12 wt %, 15 wt %, 20 wt %, 25 wt %, 30 wt %, 35 wt %, or 40 wt %, or in an amount within a range bounded by any two of the foregoing values.

In some embodiments, the particles are coated with a sizing agent, which can be any of the sizing agents well known in the art for improving the interfacial bonding of particles with a polymeric matrix. The sizing agent may be, for example, an epoxy-based (i.e., epoxy-containing) sizing agent, vinyl-containing sizing agent, hydroxy-containing (e.g., phenolic-containing) sizing agent, carboxy or carboxy ester sizing agent, or amino-containing sizing agent. In the case of an epoxy sizing agent, the epoxy composition is typically a resin, which may be, for example, a bifunctional, trifunctional, tetrafunctional, or higher functional epoxy resin. In other embodiments, the sizing agent may have any of the polymeric compositions described above for the polymer matrix. The sizing agent may be the same or different in composition from the polymer matrix.

The continuous carbon fiber precursor can be produced by any method known in the art, and typically by a melt spinning process. As well known in the art, a melt spinning process begins with a melt containing the polymer and any particles desired to be admixed therewith. The melt is generally obtained by appropriate heating of the polymer to at least its melting point so that the polymer melt is suitably flowable. The particles may be admixed with chunks or particles of the polymer during the heating process, or the solid polymer may be first heated and melted in the absence of the particles, followed by addition of the particles and mixing. In some embodiments, the melt includes only the polymer and particles in the absence of other components. Generally, as well known in the art, the melt spinning process includes a step in which a heated melt is extruded through a die at a controlled extrusion rate by means of a spinneret, and the resulting extruded fibrous form of the melt cooled to solidify the fibrous melt to form the composite fiber.

Before extrusion, the melt is mixed (i.e., compounded) in a manner that results in a homogeneous blend of the polymers and particles. The term "homogeneous blend", as used herein, indicates, at minimum, a substantially or completely uniform dispersion or distribution of particles in the polymer matrix. In the event of more than one polymer included in the melt, the term "homogeneous blend" typically also indicates that the two or more polymers are integrated to the extent that no discrete regions of isolated polymer remain on the microscale (typically at 10, 50, or 100 µm). Nevertheless, the instant disclosure includes the possibility that a certain level of polymeric heterogeneity may be desirable for certain applications. The components can be homogeneously blended by any of the methodologies known in the art for achieving homogeneous blends of solid, semi-solid, gel, paste, or liquid mixtures. For example, any of the screw or ball mixing processes, as well known in the art, may be used. In some embodiments, the shear is suitably minimized to reduce particle (particularly, filament) breakage, such as by use of a screwless extrusion process and absence of ball mixing.

In some embodiments, the melt includes one or more other components, particularly those additional components that may improve the physical properties of the melt and/or the final composite fiber. The additional component may be, for example, a plasticizer, typically to promote plasticity (i.e., fluidity), surface smoothness, and flexibility of the fibrous extrudate and to inhibit melt-fracture during the extrusion process. The one or more plasticizers included in the melt can be any of the plasticizers well known in the art and appropriate for the particular polymer being extruded. For example, in a first embodiment, the plasticizer may be a carboxy ester compound (i.e., an esterified form of a carboxylic or polycarboxylic acid), such as an ester based on succinic acid, glutaric acid, adipic acid, terephthalic acid, sebacic acid, maleic, dibenzoic acid, phthalic acid, citric acid, and trimellitic acid. In a second embodiment, the plasticizer may be an ester-, amide-, or ether-containing oligomer, such as an oligomer of caprolactam, wherein the oligomer typically contains up to or less than 10 or 5 units. In a third embodiment, the plasticizer may be a polyol (e.g., a diol, triol, or tetrol), such as ethylene glycol, diethylene glycol, triethylene glycol, glycerol, or resorcinol. In a fourth embodiment, the plasticizer may be a sulfonamide compound, such as N-butylbenzenesulfonamide, N-ethyltoluenesulfonamide, or N-(2-hydroxypropyl)benzenesulfonamide. In a fifth embodiment, the plasticizer may be an organophosphate compound, such as tributyl phosphate or tricresyl phosphate. In a sixth embodiment, the plasticizer may be an organic solvent. The organic solvent considered herein is a compound that helps to soften or dissolve the polymer and is a liquid at room temperature (i.e., a melting point of no more than 10, 20, or 30° C.). Depending on the type of polymer, the organic solvent may be, for example, any of those mentioned above (e.g., ethylene glycol or glycerol), or, for example, a hydrocarbon (e.g., toluene), ketone (e.g., acetone or butanone), amide (e.g., dimethylformamide), ester (e.g., methyl acetate or ethyl acetate), ether (e.g., tetrahydrofuran), carbonate (e.g., propylene carbonate), chlorohydrocarbon (e.g., methylene chloride), or nitrile (e.g., acetonitrile). In some embodiments, one or more classes or specific types of any of the above plasticizers are excluded from the melt. In some embodiments, the plasticizer or other auxiliary component may be removed from the extrudate by subjecting the extrudate to a post-bake process that employs a suitably high temperature (typically up to or below 150° C.) capable of volatilizing the plasticizer or other auxiliary component.

Other components may be included in the melt in order to favorably affect the physical or other properties of the melt (before or during extrusion) or the extruded composite fiber. For example, an electrical conductivity enhancing agent, such as conductive carbon particles, may be included to provide a desired level of conductivity, if so desired. To suitably increase the rigidity of the extruded composite fiber, a hardening agent, such as a crosslinking agent, curing agent, or a filler (e.g., talc), may also be included. To improve or otherwise modify the interfacial interaction between the particles and polymeric matrix, a surfactant or other interfacial agent may be included. In some embodiments, one or more classes or specific types of any the above additional components may be excluded from the melt.

The above-described carbon fiber precursor is subjected to conditions under which the precursor is converted to carbonized fiber. For purposes of the invention, prior to a carbonization process, the precursor is subjected to a thermal oxidative stabilization process. As known in the art, the stabilization process subjects a precursor fiber to heat in the presence of oxygen (typically air, oxygen-enriched air, or other oxidant, such as ozone) to render the precursor infusible so that it becomes largely carbonizable rather than volatile during the subsequent carbonization process. However, unlike stabilization processes of the art, the instant invention employs a stabilization process in which the precursor is heated to a temperature at or just below the glass transition temperature ($T_g$) of the polymer and for an extended time under tension and in the presence of a magnetic field to permit an ordering rearrangement of polymeric domains. More specifically, the fiber precursor, under tension and in the presence of a magnetic field of at least 1 Tesla, is subjected to a temperature up to (no more than) the glass transition temperature of the polymer in the fiber precursor and no less than 20° C., 10° C., or 5° C. below the glass transition temperature. Moreover, the maximum temperature at which the precursor fiber is subjected during the stabilization process is below 400° C., which requires that the $T_g$ of the polymer in the precursor fiber is less than 400° C. In some embodiments, the maximum temperature used in the stabilization process (and hence, $T_g$ of the polymer) is up to or less than, for example, 350° C., 300° C., 250° C., 200° C., 150° C., or 100° C., or the maximum temperature (and hence, $T_g$ of the polymer) is within a range bounded by any two of the foregoing maximum or intermediate values (e.g., 100-180° C., particularly in the case of a lignin-containing precursor fiber). Under the above stabilization conditions, the polymeric fiber is softened (i.e., afforded sufficient plasticity) but not melted, in order to provide the grains of the solid polymer sufficient microscopic and molecular freedom to rearrange (i.e., reorganize) into a significantly more ordered form, wherein both the magnetic field and applied tension work in concert to impart the ordering of the polymer domains (and optionally, the particles) while in the softened state. The ordering particularly considered herein is axial ordering, wherein the term "axial" refers to the lengthwise dimension of the precursor fiber.

The precursor fiber is subjected, during the stabilization process, to the above temperature in the periphery of the polymer glass transition temperature for a period of time of at least one hour while under axial tension and while subjected to a magnetic field. In different embodiments, the period of time for processing the precursor fiber under the above stabilization conditions is at least or more than 1, 2, 3, 4, 5, 10, 12, 15, 18, 24, 30, 36, or 48 hours, or a period of time within a range bounded by any two of the foregoing values.

The rate of temperature increase to the maximum temperature during the stabilization process is preferably also carefully controlled. In particular, a slow rate of temperature increase has herein been found to be further beneficial in producing a carbonized fiber having a high degree of structural order and improved mechanical properties resulting therefrom. In particular embodiments, the rate of temperature increase starting from ambient temperature (i.e., room temperature, generally 15, 20, 25, or 30° C. or therebetween) to the maximum temperature used in the stabilization process is preferably no more than or less than 5° C./min, 2° C./min, 1° C./min, or 0.5° C./min.

The magnetic field applied to the fiber precursor during the stabilization process is at least 1 Tesla. In different embodiments, the magnetic field used in the stabilization process is precisely, about, at least, above, up to, or less than, for example, 2, 3, 4, 5, 6, 7, 8, or 9 Tesla, or the magnetic field is within a range bounded by any two of the foregoing exemplary values. In one embodiment, the magnetic field is static, while in another embodiment, the magnetic field is alternating, e.g., 1, 5, 10, 50, 100, 200, 300, 400, 500, 1000, 2000, 5000, 10,000, 15,000, or 20,000 Hz. The magnetic field can be provided by any magnetic source known in the art capable of providing the magnetic fields required herein. In a preferred embodiment, the magnetic field is provided by a superconducting magnet. In some embodiments, a single magnet is used, while in other embodiments two or more magnets are used.

The magnet is positioned relative to the precursor fiber such that the precursor fiber is subjected to the desired magnetic field. The magnet can also be positioned or operated by means known in the art to orient the magnetic field in a desired direction relative to the precursor fiber. For example, the magnetic field can be oriented precisely or substantially parallel, perpendicular, or at an oblique angle to the length of the precursor fiber. In particular embodiments, the precursor fiber is passed through a cylindrical reaction tube surrounded by a superconducting magnet, wherein the magnetic field is typically oriented parallel to the length of the fiber when the fiber is oriented parallel to the length of the reaction tube. The foregoing embodiment can be conveniently practiced by, for example, incorporating a refractory reaction tube in the bore of a superconducting magnet. The fiber may be either continuously passed through the cylindrical reaction tube (e.g., fed from a winding of fiber) or processed in a batchwise manner. Typically, particularly in the case of a superconducting magnet, a cooling system is included to prevent overheating of the magnet.

In some embodiments, the magnetic field is maintained at the same or substantially the same magnetic field strength for the length of time that the precursor fiber is exposed to the magnetic field. In other embodiments, the magnetic field is varied in magnetic field strength, such as by a gradual or sudden increase or decrease in magnetic field strength between any of the exemplary magnetic field strengths provided above.

The axial tension applied to the precursor fiber during the stabilization process is a stress applied along the length of the fiber. In different embodiments, the applied axial stress can be about, at least, above, up to, or less than, for example, 0.1, 0.3, 0.5, 1, 2, 5, 10, 15, or 20 MPa.

In some embodiments, the carbon fiber precursor is also subjected to electromagnetic, plasma, or particle beam (e.g., electron or neutron beam) radiation during the stabilization or subsequent carbonization process. The electromagnetic, plasma, or particle beam exposure generally has the effect of improving the strength and/or modulus of the resulting carbonized fiber. The operation and use of electromagnetic, plasma, and particle beam radiation techniques are well known in the art.

The stabilized carbon fiber precursor, produced according to the above-described conditions, generally possesses substantially ordered domains in the polymer matrix, with substantial alignment of the domains in the axial direction of the fiber precursor, also referred to herein as long range turbostratic order. In some embodiments, the particles incorporated with the polymer matrix, particularly in the case of filamentous particles, also exhibit substantial alignment in the axial direction of the fiber precursor (for filamentous particles, alignment of the lengthwise dimensions of the particles with the axial direction of the composite fiber). The term "substantial alignment" or "substantially aligned", as used herein, generally indicates a deviation from completely aligned (i.e., 0 degrees) of up to or less than 45, 30, or 15 degrees in at least 50%, 60%, 70%, 80%, 90%, or 95% of the polymer domains and/or particles.

The stabilized carbon fiber precursor is then subjected to a carbonization process to convert the precursor fiber to a carbonized fiber. The reaction tube or chamber in which the precursor fiber is carbonized includes one or more heating elements to heat the reaction tube or chamber to a desired carbonization temperature. In some embodiments, the reaction tube or chamber includes one or more heating elements (e.g., a SiC heating element) on an end of the reaction tube or wall of a reaction chamber, or multiple heating elements may be located on different ends or locations (e.g., midpoint) of the reaction tube or chamber. In other embodiments, a substantially uniform temperature is provided to the length of the fiber in the tube or chamber, such as by including an induction coil (or other heating element) that surrounds at least a portion or entire length of the precursor fiber located in the reaction tube or chamber. By methods known in the art, the induction coil can be heated to a desired temperature by controlling the amount of high-frequency alternating current in its operation.

The carbonization step includes any of the conditions, as known in the art, that cause carbonization of the precursor fiber to form a carbonized fiber. In different embodiments, the carbonization temperature can be precisely, about, at least, or above, for example, 400° C., 450° C., 500° C., 550° C., 600° C., 650° C., 700° C., 750° C., 800° C., 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., 1800° C., 1900° C., 2000° C., 2100° C., or 2200° C., or a temperature within a range bounded by any two of the foregoing temperatures (e.g., at least 400° C. or 500° C. and up to or less than 1500° C., 1800° C., 2000° C., or 2200° C.). The amount of time that the precursor fiber is subjected to the carbonization temperature (i.e., carbonization time) is highly dependent on the carbonization temperature employed. Generally, the higher the carbonization temperature employed, the shorter the amount of time required. In different embodiments, depending on the carbonization temperature and other factors (e.g., pressure), the carbonization (processing) time can be, for example, about, at least, or no more than 0.02, 0.05, 0.1, 0.125, 0.25, 0.5, 1, 2, 3, 4, 5, 6, 7, 8, 9, 10, 11, or 12 hours, or within a range therein. In particular embodiments, it may be preferred to gradually raise the temperature at a set or varied temperature ramp rate (e.g., 5° C./min, 10° C./min, or 20° C./min). In particular embodiments, it may be preferred to pass the precursor fiber through a furnace with a gradient of temperature at the entrance and exit of the furnace and at a set temperature inside the furnace in order to achieve the desired residence time. In other embodiments, it may be preferred to subject the precursor fiber to a sudden (i.e., non-gradual) carbonization temperature. In some embodiments, after the precursor fiber is subjected to a desired carbonization temperature for a particular amount of time, the temperature is reduced either gradually or suddenly.

In particular embodiments, the carbonization process includes a low temperature carbonization step followed by a high temperature carbonization step. The two steps may be run at different temperatures independently selected from any of the exemplary temperatures provided above. In some embodiments, the low temperature step is employed as a pyrolysis step, i.e., to remove volatiles. The low temperature step can be conducted at a temperature of, for example, at least or above 400, 500, or 600° C., and up to or less than 800, 900, 1000° C., 1100° C., or 1200° C. The high temperature step is generally employed to substantially or completely carbonize the precursor. The high temperature step is preferably conducted at a temperature of at least or above 1200, 1300, 1400, 1500, 1600, 1700, 1800, 1900, 2000, or 2100° C., or at a temperature within a range bounded by any two of the foregoing temperatures, or at a temperature within a range bounded by any of the foregoing temperatures and up to or less than 2200° C. The processing times for the low and high temperature steps can each be, independently, any of the amount of times provided above. Alternatively, the combined time for the low and high temperature steps may correspond to any of the processing times provided above. If desired, one or more additional carbonization steps may be included with temperatures intermediate to the first and second carbonization steps. In some embodiments, the different steps are characterized by a distinct (i.e., non-gradual) change in temperature, such as from 600° C. in a low temperature step to 1200° C. or higher in a high temperature step. Preferably, the precursor fiber is maintained in the same reaction tube when subjected to successive carbonization steps. In other embodiments, the demarcation between carbonization steps is not so distinct, such as by gradually increasing the carbonization temperature to transition from one step into the next.

In some embodiments, the precursor fiber is not exposed to a magnetic field during the carbonization process. In other embodiments, the precursor fiber is exposed to a magnetic field during the carbonization process, in which case the magnetic field can independently have any of the magnetic field strengths and frequencies as provided above for the stabilization process. In the case of a two-step carbonization process, the precursor fiber can be subjected to the magnetic field either during the low temperature or high temperature carbonization step, or in both the low temperature and high temperature carbonization steps. In yet other embodiments, the precursor fiber is subjected to a magnetic field of any desired strength of at least 3 T only when a particular temperature is reached, and eventually the magnetic field is removed after a specified period of time or when a second temperature is reached (wherein the second temperature may be higher or lower than the first temperature).

If desired, the precursor fiber, or alternatively, the carbonized fiber, can be subjected to a temperature high enough to graphitize the carbonized fiber. Typically, the temperature capable of causing graphitization is a temperature of at least or above, for example, 2200° C., 2300° C., 2400° C., 2500° C., 2600° C., 2700° C., 2800° C., 2900° C., 3000° C., 3100° C., or 3200° C., or a temperature within a range bounded by any two of the foregoing temperatures (e.g., at least or above 2200° C. and up to or less than 3200° C.). The graphitization process may or may not also include a magnetic field, such as any of the magnetic field strengths provided above for the carbonization process.

In some embodiments, the carbonization or graphitization process is conducted in air or other oxygen-containing atmosphere. In other embodiments, the carbonization or graphitization step is conducted in an atmosphere substantially devoid of a reactive gas (e.g., oxygen or hydrogen), or an inert atmosphere, such as nitrogen ($N_2$) or a noble gas (e.g., helium or argon). The inert gas is generally made to flow at a specified flow rate, such as 0.1, 0.25, 0.50, 1, 5, 10, 20, or 30 L/min. However, one or more reactive functionalizing species may be included in the carbonization step or in a post-treatment step (e.g., at the exit of the furnace as a post-carbonization step) to suitably functionalize the carbonized fiber, e.g., by inclusion of a fluorocarbon compound to fluorinate, or inclusion of an oxygen-containing species to oxygenate (e.g., by forming hydroxy or ether groups), or inclusion of amino-, thio-, or phosphino-species to, respectively, aminate, thiolate, or phosphinate the carbonized fiber. Thus, in some embodiments, it may be desired to include at least one reactive gas, such as oxygen, hydrogen, ammonia, an organoamine, carbon dioxide, methane, a fluoroalkane, a phosphine, or a mercaptan. The one or more reactive gases may, for example, desirably change or adjust the compositional, structural, or physical characteristics of the carbonized fiber. The functionalized groups on the carbonized fiber can have a variety of functions, e.g., to bind to metal species that are catalytically active, or to modify or adjust the surface miscibility, absorptive, or wetability characteristics, such as for gas absorption and filtration applications.

The pressure employed in the carbonization (or graphitization) step is typically ambient (e.g., around 1 atm). However, in some embodiments, it may be preferred to use a higher pressure (e.g., above 1 atm, such as 1.5, 2, 5, 10, 20, 50, or 100 atm, or within a range therein) to, for example, maintain a positive pressure inside the reaction tube, chamber, or furnace and keep the sample free of oxygen at high temperature to avoid combustion or partial combustion. In other embodiments, it may be preferred to use a lower pressure (e.g., below 1 atm, such as 0.5, 0.1, 0.05, or 0.01 atm, or within a range therein).

In some embodiments, the precursor fiber is subjected to a stress (tension) along the length of the fiber during carbonization and/or graphitization. The stress can be applied to, for example, avoid fiber shrinkage, or to favorably affect or adjust properties of the resulting carbonized fiber, such as fiber strength, elasticity, elongation, crystallinity, morphology, and pore size distribution. In different embodiments, the fiber, either during carbonization and/or graphitization, is subjected to 0.1, 0.3, 0.5, 1, 2, 5, 10, or 20 MPa of stress. In other embodiments, no tension is applied to the fiber during carbonization and/or graphitization.

In other embodiments, the carbonized fiber precursor is also subjected to electromagnetic, plasma, or particle beam (e.g., electron or neutron beam) radiation during the carbonization and/or graphitization process. The electromagnetic, plasma, or particle beam exposure generally has the effect of improving the strength and/or modulus of the resulting carbonized fiber. The operation and use of electromagnetic, plasma, and particle beam radiation techniques are well known in the art.

The carbonized fiber produced by the above-described process generally has a high strength, wherein the term "high strength", as used herein, generally refers to a tensile strength of at least or greater than, for example, 600, 650, 700, 750, 800, 850, 900, 950, 1000, 1100, 1200, 1300, 1400, 1500, 1600, 1700, 1800, 1900, or 2000 ksi, (which corresponds to approximately to 4-14 GPa), or a tensile strength within a range bounded by any two of the foregoing exemplary values. The high strength is believed to be at least partly due to a long range turbostratic order characterized by alignment of graphitic planes in the carbonized fiber. In some embodiments, the carbonized fiber may also have a high modulus, wherein the term "high modulus", as used herein, generally refers to an elastic (i.e., tensile) modulus of at least 30 megapounds per square inch (30 msi), which corresponds to approximately 207 GPa. In different embodiments, the carbonized fiber has an elastic modulus of at least or greater than, for example, 30, 35, 40, 45, 50, 55, 60, 65, 70, 75, 80, 85, 90, 95, 100, 110, 120, 130, 140, or 150 msi (which corresponds to approximately 210-1050 GPa), or an elastic modulus within a range bounded by any two of the foregoing exemplary values. The elastic modulus of the carbonized fiber may be influenced by the graphitic crystal structure in the carbonized fiber and its interaction with turbostratic domains. In some embodiments, the carbonized fiber may also have a high elongation, wherein the term "elongation", as used herein, which is synonymous with the terms "ultimate elongation" and "elongation at break", generally refers to an elongation of at least 1.5%. In different embodiments, the carbonized fiber exhibits an elongation of precisely, about, at least, or greater than, for example, 1.5%, 1.8%, 2%, 2.2%, or 2.5%, or an elongation within a range bounded by any two of the foregoing exemplary values. The carbonized fiber may also advantageously possess a thermal conductivity of at least, above, up to, or less than, for example, 0.1, 1, 10, 50, 100, 150, 200, 250, 300, 350, 400, 500, 1000, 1500, 2000, or 2500 W/m-K.

The carbonized fiber may have any degree of crystallinity, including amorphous, graphitic, crystalline, and semi-crystalline forms of carbon. In some embodiments, the carbonized fiber may have characteristics of a single type of carbon structure throughout the carbonized fiber, while in other embodiments, the carbonized fiber may have two or more types of carbon structure, e.g., a more pronounced graphitic structure on the outer surface of the carbonized fiber and a more pronounced amorphous structure below the surface or in inner layers of the carbonized fiber. Moreover, the term "carbonized fiber" includes fibers constructed of only elemental carbon (i.e., 100% carbon), or fibers constructed substantially of elemental carbon, generally at least 85%, 90%, 95%, 98%, or 99% elemental carbon. An element other than carbon, if included, is generally included in a dopant amount (e.g., up to or less than 10,000, 5,000, 1,000, 500, or 100 ppm). The element other than carbon can be, for example, nitrogen, boron, oxygen, sulfur, or phosphorus, or a combination thereof. The presence or absence of non-carbon elements is strongly dependent on the composition of the precursor fiber, and whether a doping gas (e.g., ammonia or oxygen) is included or excluded in the carbonization process. Carbonized fiber produced from PAN will generally include an appreciable amount of nitrogen by virtue of the nitrile groups in PAN.

The carbonized fiber may also be in the form of a single filament or a tow of carbonized fiber. The carbonized fiber can have any desired thickness (i.e., diameter). For example, in different embodiments, the carbonized fiber can have a thickness of 0.1, 0.2, 0.5, 1, 2, 5, 10, 15, 20, 30, 40, 50, 60, 70, 80, 90, or 100 microns, or a thickness within a range bounded by any two of these values. In some embodiments, the carbonized fiber is in the form of a tow, while in other embodiments the carbonized fiber is in the form of a single filament. Continuous filaments or tows from very low count (<500) to very high counts (>50 k) are considered herein. The carbonized fibers may also be stapled or chopped to form short segments or even particles, any of which may have widths or overall or average sizes of up to or less than, for example, 1 cm, 1 mm, or 1 micron. By suitable construction or weaving methods on the precursor or carbonized fiber, as known in the art, the carbonized fiber may also be converted into a yarn, fabric, mesh (e.g., mat or web), or felt. The precursor fiber may also have any of the foregoing thicknesses, shapes, and forms.

The carbonized fiber may also be non-porous or porous. For porous carbonized fibers, the porosity is generally a result of pores on outer and/or inner surfaces (or layers) of the carbonized fiber. For a solid (i.e., non-hollow) carbonized fiber, the pores may be on the outer surface (or core segments), and for hollow carbonized fibers, the pores may be on the inner surface (i.e., surrounding hollow core). The pores may be mesopores, micropores, or macropores, or a combination thereof. In some embodiments, the carbonized fiber may exclude one or more types of pores.

As used herein and as understood in the art, the terms "mesopores" and "mesoporous" generally refer to pores having a size (i.e., pore diameter or pore size) of at least 2 nm and up to 50 nm, i.e., "between 2 and 50 nm", or "in the range of 2-50 nm". In different embodiments, the mesopores have a size of precisely or about 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 8.5 nm, 9 nm, 9.5 nm, 10 nm, 11 nm, 12 nm, 15 nm, 20 nm, 25 nm, 30 nm, 35 nm, 40 nm, 45 nm, or 50 nm, or a particular size, or a variation of sizes, within a range bounded by any two of these values.

As used herein and as understood in the art, the terms "micropores" and "microporous" generally refer to pores having a diameter of less than 2 nm. In particular embodiments, the micropores have a size of precisely, about, up to, or less than 0.5, 0.6, 0.7, 0.8, 0.9, 1.0, 1.1, 1.2, 1.3, 1.4, 1.5, 1.6, 1.7, 1.8, or 1.9 nm, or a particular size, or a variation of sizes, within a range bounded by any two of these values.

As used herein, the terms "macropores" and "macroporous" refer to pores having a size over 50 nm. Generally, the macropores considered herein have a size up to or less than 1 micron (1 μm). In different embodiments, the macropores have a size of precisely, about, at least, or greater than 60 nm, 70 nm, 80 nm, 90 nm, 100 nm, 150 nm, 200 nm, 300 nm, 400 nm, 450 nm, 500 nm, or 1000 nm, or a particular size, or a variation of sizes, within a range bounded by any two of these values.

The carbonized fiber may also have any suitable surface area (generally, a specific surface area), which is strongly dependent on the level of porosity. In different embodiments, the carbonized fiber may have a surface area of precisely, about, at least, greater than, or up to, for example, 5 $m^2/g$, 10 $m^2/g$, 15 $m^2/g$, 20 $m^2/g$, 30 $m^2/g$, 40 $m^2/g$, 50 $m^2/g$, 60 $m^2/g$, 70 $m^2/g$, 80 $m^2/g$, 90 $m^2/g$, 100 $m^2/g$, 150 $m^2/g$, 200 $m^2/g$, 250 $m^2/g$, 300 $m^2/g$, 350 $m^2/g$, 400 $m^2/g$, 450 $m^2/g$, 500 $m^2/g$, 600 $m^2/g$, 700 $m^2/g$, 800 $m^2/g$, 900 $m^2/g$, 1000 $m^2/g$, 1500 $m^2/g$, 2000 $m^2/g$, 2500 $m^2/g$, or 3000 $m^2/g$, or a surface area within a range bounded by any two of the foregoing values.

Examples have been set forth below for the purpose of illustration and to describe certain specific embodiments of the invention. However, the scope of this invention is not to be in any way limited by the examples set forth herein.

Example 1

Method for Controlling the Structural Alignment in Carbon Fibers with Naturally High Turbostratic Disorder Using Heterogeneous Nucleation This experiment provides evidence that incorporation of nanoscale particles having a continuous sp2 bonded network (e.g., carbon nanotubes or graphene) leads to heterogeneous nucleation of a graphite-like structure with a specific interface. In the process, nanoparticles were incorporated during compounding and pelletizing of a carbon fiber precursor that naturally forms structure with high turbostratic disorder, such as lignin. By applying conventional melt processing techniques with high draw ratios it was herein found possible to cause alignment of the particles during melt processing. These particles, now aligned along the fiber direction, result in control of nuclei by forming specific low energy interfaces (basal plan of the second phase, and graphite forming matrix aligned along basal planes). This result is important when forming structural or functional carbon fibers from natural precursors that tend to form a randomly oriented graphitic structure. Structural alignment along the fiber direction has herein been identified as key to forming structural materials with improved mechanical properties.

Pyrolysis of stabilized lignin-carbon fiber (LCF) precursor fibers yielded microstructures with near perfect turbostratic disorder and controllable degrees of graphitic order. These characteristics distinguish them from conventional carbon fibers of the art. Moreover, the degree of order and microstructure has herein been found to be strongly related to the electrochemical performance and cyclic life. FIGS. 1A and 1B show transmission electron microscope (TEM) micrographs of LCF-derived carbon (battery) materials that were treated with either a 1000° C. carbonization or a 2000° C. graphitization heat treatment, respectively. FIGS. 1C and 1D are corresponding structural models obtained from molecular dynamics (MD) computations, respectively. Analysis of the selected area diffraction patterns reveals that both samples have well defined short range order with significantly different long range order. Raman measurements were also conducted to quantify the degree of disorder as a function of processing conditions. Of particular significance is an observed anomalous high reversible electrochemical capacity (near the theoretical limit of graphite) linked to a pseudo amorphous bulk microstructure that exceeds the capacity of the fully graphitic materials.

Figures 2A, 2B:
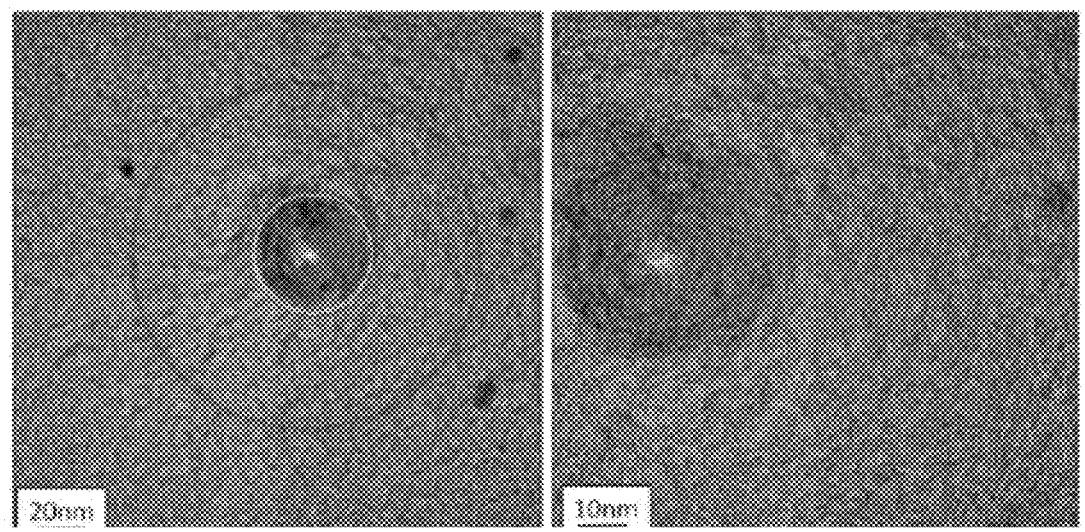
FIGS. 2A, 2B. TEM images of a cross-sectioned carbon fiber prepared from a lignin-carbon nanotube precursor.

In an effort to expand the range of physical properties that may be possible from lignin carbon fibers and circumvent some of the limitations associated with the completely random arrangement of crystallites, the effect of carbon nanotubes (CNT) was also examined. In the experiment, a mixture of a lignin and 1 wt % of CNT was melt processed into a continuous bundle of fibers. After stabilizing by methods described above, microstructural evaluations revealed that the CNT are aligned by melt spinning and bound in the carbonaceous matrix after pyrolysis. Mechanical property measurements indicated a strong physical bond between the CNTs and the matrix. The carbon structure was systematically varied from mostly amorphous to fully graphitic. Notably, incorporating a relatively small fraction of CNT was found to consistently triple the electrical conductivity in all carbonization conditions examined. FIGS. 2A and 2B are TEM images of different magnifications showing a cross-sectioned ~40 nm diameter carbon nanotube (inner circle) with an associated "swirled" graphitic matrix (outer circle) where the (002) planes are somewhat more aligned (and have a slightly larger crystallite size) than observed away from the carbon nanotube within the more random nanocrystalline matrix. The TEM images in FIGS. 2A and 2B show evidence of long range structural alignment along the fiber direction in carbon fibers from lignin precursors.

Figure 3:
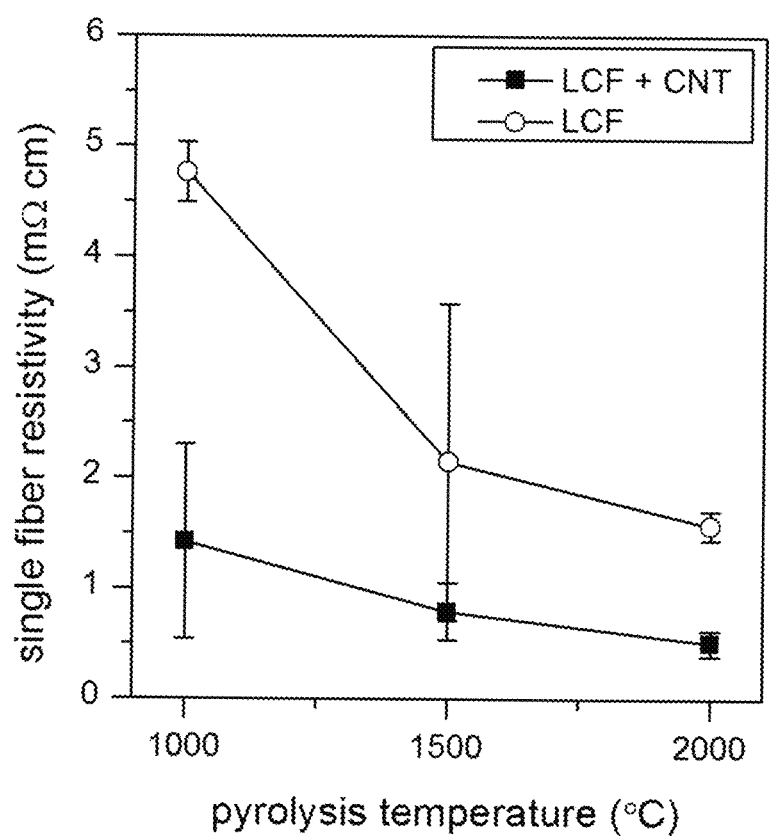
FIG. 3. Graph showing electrical resistivity at 300K of lignin-carbon fiber with and without incorporation of carbon nanotubes (CNTs) at 1000° C., 1500° C., and 2000° C.

In another experiment, to examine how the incorporation of carbon nanotubes (CNTs) affects the electrical transport properties of the lignin carbon fiber (LCF), the electrical resistivity measurements were performed at 300K using a commercial measurement system. Samples which were pyrolized at 1000° C., 1500° C. and 2000° C., both with and without CNTs, were measured. Data from three individual fibers from each sample were collected. The results are summarized in FIG. 3. For all pyrolysis temperatures examined, the LCF with CNTs showed a lower electrical resistivity than the fibers without CNTs. Addition of the CNTs reduced the resistivity by 60-70%, which is substantial, particularly in view of the weight fraction of CNTs (relative to the LCF) being less than 1 wt %. The foregoing result indicates that the CNTs induce a significant structural change in the carbon fibers.

While there have been shown and described what are at present considered the preferred embodiments of the invention, those skilled in the art may make various changes and modifications which remain within the scope of the invention defined by the appended claims.

What is claimed is:

1. A method for producing a carbon fiber, the method comprising:
   (i) subjecting a continuous carbon fiber precursor having a polymeric matrix in which strength-enhancing particles are incorporated to a stabilization process during which the carbon fiber precursor is heated to within a temperature range ranging from the glass transition temperature to no less than 20° C. below the glass transition temperature of the polymeric matrix, wherein the maximum temperature employed in the stabilization process is below 400° C., for a processing time within said temperature range of at least 1 hour in the presence of oxygen and in the presence of a magnetic field of at least 1 Tesla, while said carbon fiber precursor is held under an applied axial tension; and
   (ii) subjecting the stabilized carbon fiber precursor, following step (i), to a carbonization process.

2. The method of claim 1, wherein said maximum temperature is no more than 300° C.

3. The method of claim 1, wherein said polymer matrix has a composition comprised of lignin, polyacrylonitrile, polyolefin, viscose, rayon, or pitch.

4. The method of claim 1, wherein said polymer matrix has a composition comprising lignin.

5. The method of claim 1, wherein said strength-enhancing particles are carbon particles.

6. The method of claim 5, wherein said carbon particles are selected from carbon fibers, carbon nanotubes, graphene, graphene oxide, graphene nanoribbons, graphite, carbon black, activated carbon, carbon foam, carbon onion, carbon nanoflakes, spherical fullerenes, and amorphous carbon.

7. The method of claim 1, wherein said carbonization process is conducted at a temperature of at least 500° C.

8. The method of claim 1, wherein said carbonization process is conducted at a temperature of up to 2000° C.

9. The method of claim 1, wherein said carbonization process is conducted at a temperature of at least 800° C. and up to 1800° C.

10. The method of claim 1, wherein said magnetic field is at least 2 Tesla.

11. The method of claim 1, wherein said magnetic field is at least 3 Tesla.

12. The method of claim 1, wherein said magnetic field is at least 4 Tesla.

13. The method of claim 1, wherein said magnetic field is at least 5 Tesla.

14. The method of claim 1, wherein said processing time is at least 3 hours.

15. The method of claim 1, wherein said strength-enhancing particles are included in an amount of at least 1 wt % and up to 50 wt % with respect to the weight of the polymeric matrix.

16. The method of claim 1, wherein said strength-enhancing particles are included in an amount of at least 5 wt % and up to 40 wt % with respect to the weight of the polymeric matrix.

17. The method of claim 1, wherein the polymeric matrix in the stabilized carbon fiber precursor in step (i) possesses substantially ordered domains with alignment in the axial direction of the carbon fiber precursor.

18. The method of claim 1, wherein the carbon particles in the stabilized carbon fiber precursor in step (i) are substantially aligned in the axial direction of the carbon fiber precursor.

19. The method claim 1, wherein said continuous carbon fiber precursor is provided by a melt spinning process.

20. The method of claim 1, wherein said carbon fiber precursor is heated to within said temperature range by heating the carbon fiber precursor from ambient temperature to within said temperature range at a rate of no more than 1° C. per minute.

21. The method of claim 1, wherein said temperature range and processing time is sufficient for said polymeric matrix to remain solid but of sufficient plasticity to permit reorganization and axial ordering of polymeric domains in the polymeric matrix.

22. The method of claim 1, wherein said polymeric matrix comprises lignin, and the resulting lignin-containing carbon fiber precursor is subjected to a temperature within a range of 100-180° C. for at least one hour in the stabilization process of step (i).

* * * * *